US008138277B2

(12) United States Patent
Austermann et al.

(10) Patent No.: US 8,138,277 B2
(45) Date of Patent: Mar. 20, 2012

(54) SILANE-MODIFIED UREA DERIVATIVES, METHOD FOR THE PRODUCTION THEREOF, AND USE THEREOF AS AUXILIARY RHEOLOGICAL AGENTS

(75) Inventors: Tobias Austermann, Lingen (DE); Michael Duetsch, Traunstein (DE); Marc Laurent, Eden Prairie, MN (US); Helmut Mack, Traunstein (DE); Michael Porsch, Minneapolis, MN (US); Konrad Wernthaler, Minnetonka, MN (US)

(73) Assignee: Construction Research & Technology GmbH, Trostberg (DE)

( * ) Notice: Subject to any disclaimer, the term of this patent is extended or adjusted under 35 U.S.C. 154(b) by 457 days.

(21) Appl. No.: 11/920,196

(22) PCT Filed: Jun. 6, 2006

(86) PCT No.: PCT/EP2006/005385
§ 371 (c)(1),
(2), (4) Date: Dec. 6, 2007

(87) PCT Pub. No.: WO2006/131314
PCT Pub. Date: Dec. 14, 2006

(65) Prior Publication Data
US 2008/0125529 A1 May 29, 2008

(30) Foreign Application Priority Data
Jun. 7, 2005 (DE) .......................... 10 2005 026 085

(51) Int. Cl.
C08L 83/16 (2006.01)
(52) U.S. Cl. ........ 525/477; 525/100; 556/413; 556/418; 556/419; 556/420; 556/424; 556/436; 556/437
(58) Field of Classification Search .................. None
See application file for complete search history.

(56) References Cited

U.S. PATENT DOCUMENTS

| | | | | |
|---|---|---|---|---|
| 3,276,907 A | * | 10/1966 | Huber et al. | 127/28 |
| 3,576,033 A | | 4/1971 | Tesoro et al. | |
| 3,726,907 A | * | 4/1973 | Tesoro et al. | 556/420 |
| 3,893,956 A | | 7/1975 | Brandt | |
| 3,903,052 A | | 9/1975 | Wagner et al. | |
| 4,255,203 A | | 3/1981 | Kranz et al. | |
| 4,456,718 A | | 6/1984 | Brinkmann et al. | |
| 4,539,345 A | | 9/1985 | Hansen | |
| 4,629,775 A | * | 12/1986 | Arai et al. | 528/17 |
| 4,719,278 A | | 1/1988 | Wellner et al. | |
| 4,963,636 A | | 10/1990 | Mulhaupt et al. | |
| 6,268,456 B1 | * | 7/2001 | Gregorovich et al. | 528/35 |
| 6,320,066 B1 | * | 11/2001 | Audenaert et al. | 556/421 |
| 2003/0232949 A1 | * | 12/2003 | Roesler et al. | 528/28 |
| 2007/0274934 A1 | * | 11/2007 | Chodorowski-Kimmes | 424/61 |

FOREIGN PATENT DOCUMENTS

| | | |
|---|---|---|
| DE | 1 181 397 | 11/1964 |
| DE | 2 155 259 A1 | 5/1973 |
| DE | 2 360 019 A1 | 6/1974 |
| DE | 2 906 111 A1 | 8/1980 |
| DE | 3 714 763 A1 | 11/1988 |
| DE | 693 23 901 T2 | 8/1999 |
| DE | 299 24 111 U1 | 1/2002 |
| DE | 698 07 928 T2 | 6/2003 |
| DE | 698 14 302 T2 | 4/2004 |
| DE | 696 29 189 T2 | 6/2004 |
| EP | 0 239 870 A2 | 10/1987 |
| EP | 0 268 559 A2 | 5/1988 |
| EP | 0 498 442 A | 8/1992 |
| EP | 0915113 | 5/1999 |
| GB | 1 384 159 | 2/1975 |
| GB | 2 340 125 A | 2/2000 |
| JP | 59-197421 | 11/1984 |
| JP | 62-290781 | 12/1987 |
| JP | 2007051302 | 3/2007 |
| WO | WO 9413723 | 6/1994 |
| WO | WO 97/40103 A1 | 10/1997 |
| WO | WO 9928363 | 6/1999 |

OTHER PUBLICATIONS

"Self-Organized Hybrid Silica with Long-Range Ordered Lamellar Structure" authored by Moreau et al. and published in JACS (2001) 123, 7957-7958.*
Mel'Nik, et al, "Synthersis of Alkoxysilanes as Starting Substances for Preparation of New Materials by the Sol-Gel Procedure. [..]", *Rus. J. Gen.Chem.* vol. 74, No. 11 (2004), pp. 1658-1664.
Quinghong, et al. "Influence of Alkylene Chain Length on the Morphology of Chiral Bridged Silsesquioxanes", *J. Sol-Gel Sci. Tech.*, 32 (2004), pp. 111-115.
"Thixotropic", CD Roemp Chemie Lexikon—Version 1.0, Stuttgart/New York: Georg Thieme Publishers 1995.

* cited by examiner

*Primary Examiner* — Marc Zimmer

(74) *Attorney, Agent, or Firm* — Fulbright & Jaworski, L.L.P.

(57) ABSTRACT

Disclosed are silane-modified urea derivatives which can be produced by reacting diisocyanates with aminosilanes, hydroxysilanes, or mercaptosilanes. The inventive silane-modified urea derivatives are suitable especially for use as auxiliary rheological agents, preferably as thixotropic agents for silane-crosslinking systems, particularly for single-component and two-component adhesives and sealants, paint, lacquers, and coating while causing substantially no increase in viscosity, not being subject to discoloring, being reactive, and positively influencing mechanics.

23 Claims, No Drawings

SILANE-MODIFIED UREA DERIVATIVES, METHOD FOR THE PRODUCTION THEREOF, AND USE THEREOF AS AUXILIARY RHEOLOGICAL AGENTS

This application is a §371 of PCT/EP2006/005385 filed Jun. 6, 2006, which claims priority from German Patent Application No: 10 2005 026 085.3 filed Jun. 7, 2005.

The present invention relates to silane-modified urea derivatives, a process for their preparation and their use as rheology auxiliaries, i.e. as agents for changing the rheological properties of substances, preferably as thixotropic agents for silane-crosslinking systems, i.e. as thickeners or agents for maintaining thixotropic properties of substances, in particular for one-component and two-component adhesives and sealants, paints, finishes and coatings.

Thixotropic agents are used in the production of stable flowable products. Inorganic fillers, such as, for example, carbon black, flame silica or precipitated silica, are often used as thixotropic agents. In the case of these substances, however, there is an increase in the viscosity, which is disadvantageous particularly in the machine processing of the products.

It is also possible to use organic thixotropic agents, for example microcrystalline polyamide waxes (Crayvallac®, Disparlon®), hydrolyzed castor oils or urea derivatives. Urea derivatives are usually prepared in a reactive carrier material, such as, for example, polyetherpolyol, or in a nonreactive carrier material, e.g. a plasticizer. Urea derivatives are preferably used as pastes, for example in classical one-component and two-component polyurethane products (DE-A 18 05 693). Here, an aromatic, monomeric diisocyanate compound, such as, for example, MDI=4,4'-diphenylmethylene diisocyanate, is preferably reacted as far as possible stoichiometrically with an aliphatic amine compound, such as, for example, n-butylamine.

Since the addition reaction is extremely exothermic, the urea derivatives are formed immediately after the mixing of the components in the form of a solid in the carrier material. Carrying out the process exactly is of decisive importance for constant product quality.

However, the thixotropic agents of the prior art have disadvantages, such as, for example, low light stability and an undesired increase in the viscosity.

It was the object of the present invention to provide novel rheology auxiliaries which at least partly overcome the disadvantages of the prior art and have improved performance characteristics, in particular with regard to the light stability and viscosity stability.

This object was achieved, according to the invention, by silane-modified urea derivatives of the general formula (I)

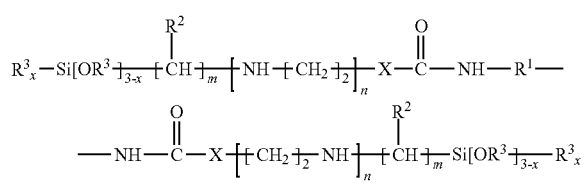

In the above formula (I), X, in each case independently, is $NR^4$, S or O.

$R^4$ is H, a $C_1$-$C_4$-alkyl radical, for example methyl, ethyl or propyl, or a $C_6$-$C_{20}$-aryl radical, in particular a $C_6$-$C_{10}$-aryl radical, e.g. phenyl or naphthyl.

$R^1$ may be a $C_1$-$C_{12}$-alkylene radical, in particular a $C_1$-$C_6$-alkylene radical, which may be linear or branched, for example ethylene or propylene, or a $C_6$-$C_{20}$-cycloalkylene radical, in particular a $C_1$-$C_{10}$-cycloalkylene radical, which is optionally unsaturated and may therefore have one or more double bonds. In addition, $R^1$ may be a $C_6$-$C_{20}$-arylene radical, in particular a $C_6$-$C_{10}$-arylene radical, which may optionally also have $C_1$-$C_4$-alkyl substituents, for example methyl, ethyl or propyl. $R^1$ may also be —$C_6H_4$—$CH_2$—$C_6H_4$—.

In the general formula (I) $R^2$, in each case independently, may be H or a $C_1$-$C_4$-alkyl radical, for example methyl, ethyl or propyl.

$R^3$, in each case independently, is a $C_1$-$C_{20}$-alkyl radical, preferably a $C_1$-$C_4$-alkyl radical, for example methyl, ethyl or propyl, or a $C_6$-$C_{20}$-aryl radical, in particular a $C_6$-$C_{12}$-aryl radical, preferably phenyl or naphthyl.

In addition, m is 1 or 3, n is from 0 to 10, preferably from 0 to 5 and in particular from 0 to 2 and x is from 0 to 2, preferably from 0 to 1.

It has surprisingly been found that the silane-modified urea derivatives according to the invention can be used in an outstanding manner as rheology auxiliaries and in particular thixotropic agents and are distinguished in particular in that they cause only a very small or substantially no increase in viscosity and do not give rise to any exudation or migration due to liquid formation.

The silane-modified urea derivatives according to the invention are furthermore distinguished, as rheology auxiliaries or thixotropic agents, in that they do not become discolored, are reactive and positively influence the mechanical properties.

In addition, the silane-modified urea derivatives according to the invention can be technically prepared and handled without problem. Moreover, activation of the thixotropic agents according to the invention, which are light-stable and reactive, for example by supply of heat or shear forces, is not required.

Owing to their outstanding performance characteristics, the silane-modified urea derivatives according to the invention are particularly suitable for industrial use.

The silane-modified urea derivatives according to the invention can be very easily from the corresponding aromatic and/or aliphatic diisocyanates of the general formula (II)

with a silane compound of the general formula (III)

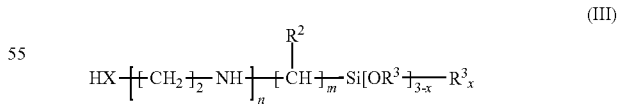

in which X, $R^1$, $R^2$, $R^3$, m, n and x have the abovementioned meaning.

For example, aromatic compounds, such as, for example, toluylene 2,4-diisocyanate and isomers thereof (TDI) or diphenylmethane 4,4'-diisocyanate and isomers thereof (MDI), and aliphatic or cycloaliphatic diisocyanates, such as, for example, 3-isocyanatomethyl 3,5,5-trimethylcyclohexyl isocyanate (IPDI), dicyclohexylmethane 4,4'-diisocyanate and isomers (H12MDI), hexamethylene diisocyanate (HDI)

and 2,2,4-trimethylhexamethylene diisocyanate and 2,4,4-trimethylhexamethylene diisocyanate (TMDI), can be used as preferred diisocyanates.

A primary aminosilane of the general formula (IV)

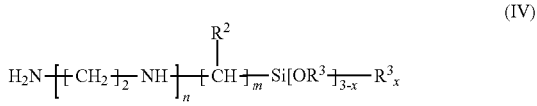
(IV)

in which $R^2$, $R^3$, m, n and x have the abovementioned meaning is preferably used as the silane compound. N-beta-aminoethyl-gamma-propyltrimethoxysilane (DS DAMO), gamma-aminopropyltriethoxysilane (DS AMEO), gamma-aminopropyltrimethoxysilane (DS AMMO), and/or gamma-aminopropylmethyldiethoxysilane (DS 1505) are preferably used. However, it is also possible to use any desired oligomeric aminosilanes, such as, for example, an oligomeric diamino-functional silane (DS 1146).

In a further embodiment of the present invention, the silane compound used is a secondary aminosilane of the general formula (V)

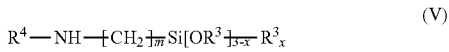
(V)

in which $R^3$, $R^4$, m and x have the abovementioned meaning. An example of a preferred secondary aminosilane of the formula (V) is aminobutyl-gamma-propyltrimethoxysilane (DS 1189).

In a further embodiment of the present invention, secondary aminosilanes of the general formula (VI)

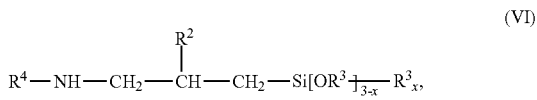
(VI)

in which $R^2$, $R^4$ and x have the abovementioned meaning, are used. An example of a preferred secondary aminosilane of the formula (VI) is N-ethylaminoisobutyltrimethoxysilane (Silquest A-Link 15), obtainable from GE Silicones.

In a further embodiment of the present invention, the silane compound used is a mercaptosilane of the general formula (VII)

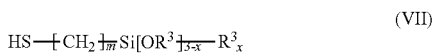
(VII)

in which $R^3$, m and x have the abovementioned meaning. Preferred mercaptosilanes are, for example, 3-mercaptopropyltrimethoxysilane (DS MTMO) and oligomeric mercaptosilanes.

Furthermore, a hydroxysilane, for example a sulfosilane, in particular $HOSO_2-CH_2-CH_2-CH_2-Si(OR)_3$, can be used as the silane compound.

The reaction of the diisocyanate of the general formula (II) with the silane compound of the general formula (III) is usually effected at temperatures from about 0 to about 100° C., preferably from about 20 to about 80° C., in particular from about 40 to about 60° C. The temperature is preferably <50° C.

In a particularly preferred embodiment of the present invention, the reaction is carried out in the presence of a carrier material and optionally of a water scavenger. The carrier material may consist of a reactive or an unreactive compound.

Compounds selected from the group consisting of long-chain polymers, e.g. silicones or polyols, in particular end-capped polyols, esters, for example adipates, sebacates or biodiesel, alkylated benzenes, phthalates, aliphatic and/or aromatic hydrocarbons, and mixtures thereof are preferably used as unreactive carrier materials.

Silylated polymers based on polyethers, polyurethanes, polysulfides, silicones, acrylates, methacrylates or any desired mixtures thereof are preferably used as reactive carrier materials. Examples of reactive carrier materials are silylated polyols, for example prepared from isocyanatosilanes and polyetherpolyols, or polyols, in particular based on polyethers, blocked isocyanate polymers (as described in Progress in Organic Coatings, 3 (1979), pages 73 to 99, and Progress in Organic Coatings, 9 (1981), pages 2 to 28), silylated polymers, for example MS polymer, MAX polymer, XMAP, CRX polymer from Kaneka, Excestar from Asahi Glass Chemical, Desmoseal from Bayer, Polymer ST from Hanse-Chemie, WXP from Witton, which are described in EP 0 355 426 A1, U.S. Pat. No. 3,627,722 B1, DE 40 29 505 A1, U.S. Pat. No. 5,364,955 B1, EP 0 918 062 A1, U.S. Pat. No. 5,910,555 B1) and/or polymers which contain acrylate groups and can be prepared, for example, by reacting prepolymers which contain isocyanate groups with hydroxyethyl (meth)acrylate, which is described in EP 0 675 144. It is of course also possible to use any desired mixtures of the carrier materials described above.

According to the invention, it is also possible to use suitable water scavengers, such as, for example, vinylsilanes, CaO, zeolites, silicic acid esters, alkylsilanes and mixtures thereof. Surprisingly, it was found that the shelf-life of the silane-modified urea derivatives according to the invention in the carrier material is further increased by using water scavengers.

The concentration of the water scavengers can be varied within wide limits but it has proven particularly advantageous to adjust this concentration to 0.01 to 40% by weight, preferably 0.1 to 10% by weight and particularly preferably 0.2 to 5% by weight, based on the total weight of carrier material and urea derivative.

The concentration of the silane-modified urea derivative in the carrier material is preferably from about 5 to about 90% by weight, in particular from about 10 to about 60% by weight and particularly preferably from about 15 to about 50% by weight.

In a preferred embodiment, the silane-modified urea derivative according to the invention is prepared in the presence of a binder. In this way, it is possible to ensure that the reactive silane-modified urea derivative is incorporated into the polymer matrix or interwoven therewith after the crosslinking of the binder, which is preferably silane-modified. In this embodiment, the urea derivative influences the mechanical properties positively and no longer diffuses out of the cured material.

The preparation of the silane-modified urea derivative according to the invention can also be effected externally, i.e. separately from the binder, it being possible to add it to the binder as an additive, preferably in the form of a paste.

The present invention furthermore relates to the use of the silane-modified urea derivatives as rheology auxiliaries, in particular as thixotropic agents. They are preferably used in one- or two-component curable polymer systems, in particular in one-component and two-component adhesives and sealants, paints, finishes and coatings. A two-component system which is crosslinked by mixing a binder, for example a resin component, with a curing agent is preferred here. The resin component contains one or more reactive groups, such as, for example, acrylate, epoxide, isocyanate, silane, mercapto or hydroxyl groups. Curing agents which can be used are, for example, compounds containing amino, hydroxyl, silane and/or sulfur groups, initiators for initiating a polymerization of double bonds, water, catalysts and/or metal oxides.

The crosslinkable system may also be a one-component system which is curable preferably either thermally, for example by heat, by means of ultrasound with water from the surrounding humidity or by the action of radiation, such as, for example, UV radiation.

The silane-modified urea derivatives according to the invention are present in the binder, i.e. in the resin component, preferably in a concentration of from about 0.1 to about 80% by weight, preferably from about 2 to about 50% by weight and particularly preferably from about 5 to about 30% by weight.

The urea derivative according to the invention may be present in situ in the binder but it can also be added separately as an additive in pasty form to the binder together with the other additives, for example fillers, plasticizers, adhesion promoters, drying agents, solvents, catalysts and/or UV stabilizers.

The following examples serve for further explanation of the invention.

EXAMPLES

Preparation of the Silane-Modified Urea Derivatives According to the Invention

1. External Preparation 60 g of phthalate plasticizer (Jayflex DIUP) are initially taken in a vessel together with 13.12 g of diisocyanate (Vestanat H12MDI, MG 262.35). 22.14 g of aminosilane (Dynasylan AMEO, MW 221) are then added in portions over a period of 30 minutes with thorough mixing. The temperature should not exceed 50° C. A colorless, milky, odorless, highly viscous paste is obtained. The residual isocyanate content is zero by titration according to ASTM D 1638 and by IR spectroscopy. Finally, 0.5% by weight of a water scavenger (Dynasylan VTMO) is added.

The paste thus obtained is introduced as an additive into a silylated polyurethane prepolymer (polymer ST-67 from Hanse-Chemie) and formulated with fillers and further additives to give a sealant.

2. In Situ Preparation in the Binder 60 g of a silylated polyurethane prepolymer (polymer ST-67 from Hanse-Chemie) are initially taken together with 6.55 g of diisocyanate (Vestanat H12MDI) and 13.05 g of phthalate plasticizer (Jayflex DIUP) in a mixing container. 8.94 g of aminosilane (Dynasylan AMMO, MW 179) are then added in portions over a period of 15 minutes with thorough mixing and stirring. The residual isocyanate content is zero by titration according to ASTM D 1638 and by IR spectroscopy. Directly thereafter, the binder thus obtained is formulated with fillers and further additives to give a sealant.

3. Use Example

The formulation was carried out in a Molteni Labmax laboratory mixer. The flow behavior of the ready-formulated sealants was determined by means of a material tester type Zwick Z2.5/TN 1S as an ejection force with a 3 mm nozzle at 23° C. The mechanical properties were determined using punched-out standard test specimens.

a) Addition of the Thixotropic Agent Prepared According to Example 1

| | |
|---|---|
| Thixotropic agent according to the invention [g] | 200 |
| Silylated binder ST-67, Hanse [g] | 200 |
| Chalk BLR2 filler, Omya [g] | 350 |
| Phthalate plasticizer DIUP, Exxon [g] | 50 |
| Tinuvin 327, UV absorber, Ciba [g] | 2 |
| Tin catalyst DBTL, Rohm + Haas [g] | 4 |
| Dynsylan VTMO water scavenger, Degussa [g] | 6 |
| Homogeneity after formulation | very good, soft and pasty |
| Ejection force, fresh [N] | 720 |
| Ejection force, 1 week at 60° C. [N] | 770 |
| Skin formation time [min] | 80 |
| Tensile strength [MPa] | 2.9 |
| Shelf-life, 4 weeks at 60° C. | satisfactory | b) In Situ Preparation of the Thixotropic Agent Prepared According to Example 2

| | |
|---|---|
| Thixotropic agent according to the invention in the silylated binder ST-67, Hanse [g] | 400 |
| Chalk BLR2 filler, Omya [g] | 350 |
| Phthalate plasticizer DIUP, Exxon [g] | 50 |
| Tinuvin 327, UV absorber, Ciba [g] | 2 |
| Tin catalyst DBTL, Rohm + Haas [g] | 4 |
| Dynsylan VTMO water scavenger, Degussa [g] | 6 |
| Homogeneity after formulation | very good, pasty and soft |
| Ejection force, fresh [N] | 510 |
| Ejection force, 1 week at 60° C. [N] | 550 |
| Skin formation time [min] | 90 |
| Tensile strength [MPa] | 2.3 |
| Shelf-life, 4 weeks at 60° C. | satisfactory |

The invention claimed is:

1. A method for preparing a composition, said composition comprising a reactive carrier material and a silane-modified urea derivative of formula (I)

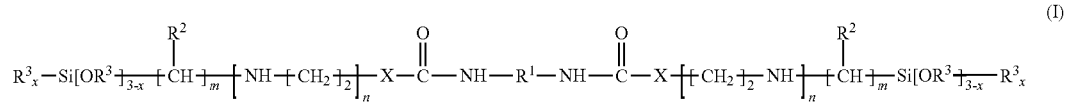

wherein

X, in each instance independently, is NR$^4$, S or O;

$R^1$ is a linear or branched $C_1$-$C_{12}$-alkylene radical, a saturated or unsaturated $C_6$-$C_{20}$-cycloalkylene radical, a $C_6$-$C_{20}$-arylene radical which is unsubstituted or substituted with at least one $C_1$-$C_4$-alkyl substituent, or —$C_6H_4$—$CH_2$—$C_6H_4$;

$R^2$ in each instance is independently is H or a $C_1$-$C_4$-alkyl radical;

$R^3$ in each instance a $C_1$-$C_{20}$-alkyl or $C_6$-$C_{20}$-aryl radical;

$R^4$ is H, $C_1$-$C_4$-alkyl or $C_6$-$C_{20}$-aryl radical;

m is 1 or 3;

n is from 0 to 10; and x is from 0 to 2, comprising reacting a diisocyanate of formula (II)

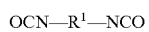  (II)

OCN—$R^1$—NCO with a silane compound of formula (III)

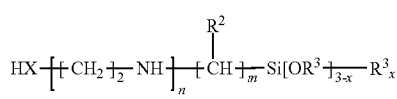  (III)

at a temperature of from 0 to 100° C., wherein X, $R^1$, $R^2$, $R^3$, m, n and x are as defined above;

wherein the reaction of the diisocyanate with the silane compound is carried out in the presence of the reactive carrier material; and wherein the reactive carrier material is a silylated polymer based on a polyether, a polyurethane, a polysulfide, a silicone, an acrylate, a methacrylate or a mixture thereof.

2. The method as claimed in claim 1, wherein the silane compound is a primary aminosilane of formula (IV)

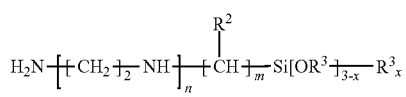  (IV)

wherein $R^2$, $R^3$, m, n and x are as defined above.

3. The method as claimed in claim 1, wherein the silane compound is a secondary aminosilane of formula (V)

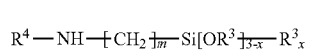  (V)

wherein $R^3$, $R^4$, m and x are as defined above.

4. The method as claimed in claim 1, wherein the silane compound used is a secondary aminosilane of formula (VI)

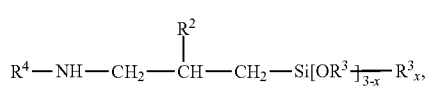  (VI)

wherein $R^2$, $R^4$ and x are as defined above.

5. The method as claimed in claim 1, wherein the silane compound is a mercaptosilane of formula (VII)

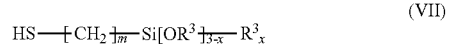  (VII)

wherein $R^3$, m and x are as defined above.

6. The method as claimed in claim 1, wherein the reaction of the diisocyanate with the silane compound is conducted in the presence of a water scavenger.

7. The method as claimed in claim 6, wherein the water scavenger is a vinylsilane, CaO, a zeolite, a silicic acid ester, an alkylsilane and a mixture thereof.

8. The method as claimed in claim 6, wherein the water scavenger is present in a concentration of from 0.01 to 40% by weight based on the total weight of carrier material and urea derivative.

9. The process as claimed in claim 1, wherein the silane-modified urea derivative is present in the carrier material in a concentration of from 5 to 90% by weight.

10. A method for preparing a composition, said composition comprising a reactive carrier material and a silane-modified urea derivative of formula (I)

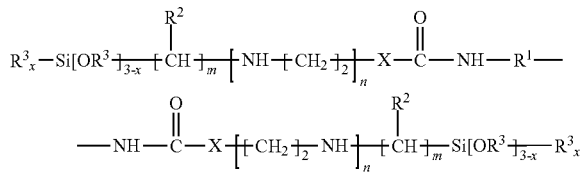  (I)

wherein

X, in each instance independently, is $NR^4$, S or O;

$R^1$ is a linear or branched $C_1$-$C_{12}$-alkylene radical, a saturated or unsaturated $C_6$-$C_{20}$-cycloalkylene radical, a $C_6$-$C_{20}$-arylene radical which is unsubstituted or substituted with at least one $C_1$-$C_4$-alkyl substituent, or —$C_6H_4$—$CH_2$—$C_6H_4$;

$R^2$ in each instance is independently is H or a $C_1$-$C_4$-alkyl radical;

$R^3$ in each instance a $C_1$-$C_{20}$-alkyl or $C_6$-$C_{20}$-aryl radical;

$R^4$ is H, $C_1$-$C_4$-alkyl or $C_6$-$C_{20}$-aryl radical;

m is 1 or 3;

n is from 0 to 10; and x is from 0 to 2, comprising reacting a diisocyanate of formula (II)

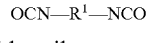  (II)

OCN—$R^1$—NCO with a silane compound of formula (III)

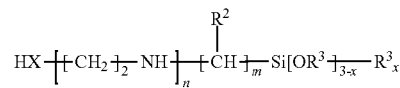  (III)

at a temperature of from 0 to 100° C., wherein X, $R^1$, $R^2$, $R^3$, m, n and x are as defined above;

wherein the reaction of the diisocyanate with the silane compound is carried out in the presence of the reactive carrier material; and wherein the reactive carrier material is a cross-linkable binder.

11. The method as claimed in claim 10, wherein the silane compound is a primary aminosilane of formula (IV)

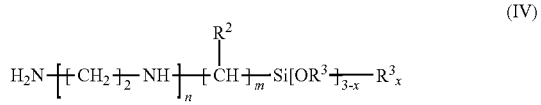
(IV)

wherein R², R³, m, n and x are as defined above.

12. The method as claimed in claim 10, wherein the silane compound is a secondary aminosilane of formula (V)

(V)

wherein R³, R⁴, m and x are as defined above.

13. The method as claimed in claim 10, wherein the silane compound used is a second inosilane of formula (VI)

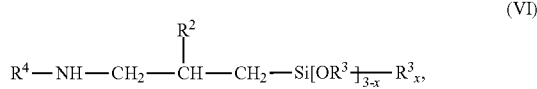
(VI)

wherein R², R⁴ and x are as defined above.

14. The method as claimed in claim 10, wherein the silane compound is a mercaptosilane of formula (VII)

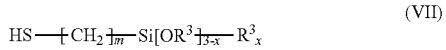
(VII)

wherein R³, m and x are as defined above.

15. The method as claimed in claim 10, wherein the reaction of the diisocyanate with the silane compound is conducted in the presence of a water scavenger.

16. The method as claimed in claim 15, wherein the water scavenger is a vinylsilane, CaO, a zeolite, a silicic acid ester, an alkylsilane and a mixture thereof.

17. The method as claimed in claim 15, wherein the water scavenger is present in a concentration of from 0.01 to 40% by weight based on the total weight of carrier material and urea derivative.

18. The process as claimed in claim 10, wherein the silane-modified urea derivative is present in the carrier material in a concentration of from 5 to 90% by weight.

19. A composition consisting of a rheology auxiliary consisting of silane-modified urea derivative of formula (I)

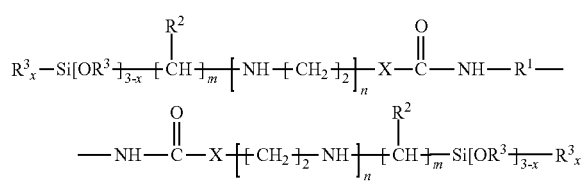
(I)

wherein
X, in each instance is independently selected from NR⁴ or O;
R¹ is a linear or branched $C_1$-$C_{12}$-alkylene radical, a saturated or unsaturated $C_6$-$C_{20}$-cycloalkylene radical, a $C_6$-$C_{20}$-arylene radical which is unsubstituted or substituted with at least one $C_1$-$C_4$-alkyl substituent, or —$C_6H_4$—$CH_2$—$C_6H_4$;
R² in each instance is independently is H or a $C_1$-$C_4$-alkyl radical;
R³ in each instance a $C_1$-$C_{20}$-alkyl or $C_6$-$C_{20}$-aryl radical;
R⁴ is H, $C_1$-$C_4$-alkyl or $C_6$-$C_{20}$-aryl radical;
m is 1 or 3;
n is from 0 to 10;
x is from 0 to 2; and
a one- or two-component curable polymer system,
wherein the one-or two-component curable polymer system consists of a cross-linkable binder, wherein the cross-linkable binder is a silylated polymer based on a polyether, a polyurethane, a polysulfide, a silicone, an acrylate, a methacrylate or a mixture thereof.

20. A method for improving the rheology of a one- or two-component curable polymer system, comprising introducing a silane-modified urea derivative of formula (I)

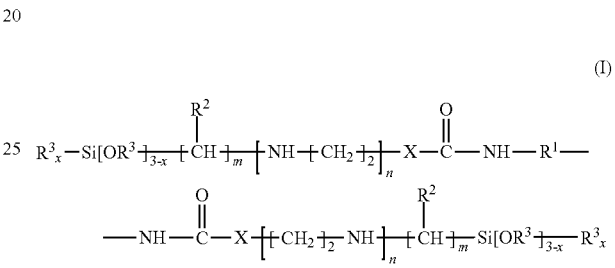
(I)

wherein
X, in each instance is independently selected from NR⁴ or O;
R¹ is a linear or branched $C_1$-$C_{12}$-alkylene radical, a saturated or unsaturated $C_6$-$C_{20}$-cycloalkylene radical, a $C_6$-$C_{20}$-arylene radical which is unsubstituted or substituted with at least one $C_1$-$C_4$-alkyl substituent, or —$C_6H_4$—$CH_2$—$C_6H_4$;
R² in each instance is independently is H or a $C_1$-$C_4$-alkyl radical;
R³ in each instance a $C_1$-$C_{20}$-alkyl or $C_6$-$C_{20}$-aryl radical;
R⁴ is H, $C_1$-$C_4$-alkyl or $C_6$-$C_{20}$-aryl radical;
m is 1 or 3;
n is from 0 to 10; and
x is from 0 to 2 into the one- or two-component polymer system,
wherein the one-or two-component curable polymer system consists of a cross-linkable binder, wherein the cross-linkable hinder is a silylated polymer based on a polyether, a polyurethane, a polysulfide, a silicone, an acrylate, a methacrylate or a mixture thereof.

21. A composition consisting of a silane-modified urea derivative of formula (I)

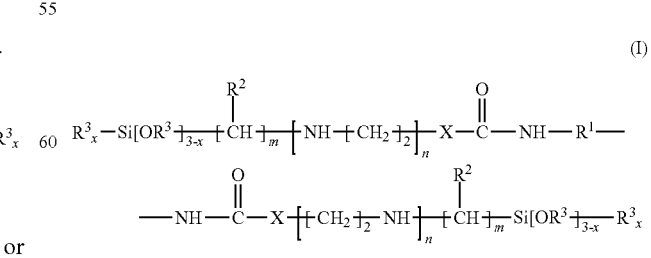
(I)

wherein X, in each instance is independently selected from NR⁴ or O;

R[1] is a linear or branched $C_1$-$C_{12}$-alkylene radical, a saturated or unsaturated $C_6$-$C_{20}$-cycloalkylene radical, a $C_6$-$C_{20}$-arylene radical which is unsubstituted or substituted with at least one $C_1$-$C_4$-alkyl substituent, or —$C_6H_4$—$CH_2$—$C_6H_4$;

R[2] in each instance is independently is H or a $C_1$-$C_4$-alkyl radical;

R[3] in each instance a $C_1$-$C_{20}$-alkyl or $C_6$-$C_{20}$-aryl radical;

R[4] is H, $C_1$-$C_4$-alkyl or $C_6$-$C_{20}$-aryl radical;

m is 1 or 3;

n is from 0 to 10;

x is from 0 to 2; and a one- or two-component curable polymer system, and at least one additive selected from the group consisting of a filler, a plasticizer, an adhesion promoter, a drying agent, a solvent, a catalyst and a UV-stabilizer;

wherein the one- or two-component curable polymer system consists of a cross-linkable binder, wherein the cross-linkable binder is a silylated polymer based on a polyether, a polyurethane, a polysulfide, a silicone, an acrylate, a methacrylate or a mixture thereof.

22. A composition consisting of a silane-modified urea derivative of formula (I)

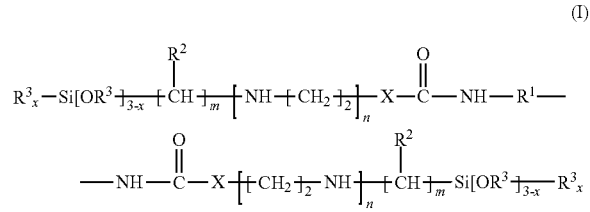

wherein X, in each instance is independently selected from NR[4] or O;

R[1] is a linear or branched $C_1$-$C_{12}$-alkylene radical, a saturated or unsaturated $C_6$-$C_{20}$-cycloalkylene radical, a $C_6$-$C_{20}$-arylene radical which is unsubstituted or substituted with at least one $C_1$-$C_4$-alkyl substituent, or —$C_6H_4$—$CH_2$—$C_6H_4$;

R[2] in each instance is independently is H or a $C_1$-$C_4$-alkyl radical;

R[3] in each instance a $C_1$-$C_{20}$-alkyl or $C_6$-$C_{20}$-aryl radical;

R[4] is H, $C_1$-$C_4$-alkyl or $C_6$-$C_{20}$-aryl radical;

m is 1 or 3;

n is from 0 to 10;

x is from 0 to 2; and a one- or two-component curable polymer system, and at least one additive selected from the group consisting of a filler, a plasticizer, an adhesion promoter, a drying agent, a solvent, a catalyst and a UV-stabilizer; wherein the one- or two-component curable polymer system consists of a cross-linkable binder and a curing agent, wherein the cross-linkable binder is a silylated polymer based on a polyether, a polyurethane, a polysulfide, a silicone, an acrylate, a methacrylate or a mixture thereof.

23. A composition consisting of a silane-modified urea derivative of formula (I)

wherein X, in each instance is independently selected from NR[4] or O;

R[1] is a linear or branched $C_1$-$C_{12}$-alkylene radical, a saturated or unsaturated $C_6$-$C_{20}$-cycloalkylene radical, a $C_6$-$C_{20}$-arylene radical which is unsubstituted or substituted with at least one $C_1$-$C_4$-alkyl substituent, or —$C_6H_4$—$CH_2$—$C_6H_4$;

R[2] in each instance is independently is H or a $C_1$-$C_4$-alkyl radical;

R[3] in each instance a $C_1$-$C_{20}$-alkyl or $C_6$-$C_{20}$-aryl radical;

R[4] is H, $C_1$-$C_4$-alkyl or $C_6$-$C_{20}$-aryl radical;

m is 1 or 3;

n is 0;

x is from 0 to 2; and a one- or two-component curable polymer system, and at least one additive selected from the group consisting of a filler, a plasticizer, an adhesion promoter, a drying agent, a solvent, a catalyst and a UV-stabilizer.

* * * * *